United States Patent

Clark

[15] 3,663,877

[45] May 16, 1972

[54] BRUSHLESS DC MOTOR INCLUDING TACHOMETER COMMUTATION CIRCUIT

[72] Inventor: Harold V. Clark, Palo Alto, Calif.

[73] Assignee: Ampex Corporation, Redwood City, Calif.

[22] Filed: Apr. 2, 1970

[21] Appl. No.: 25,054

[52] U.S. Cl. .............................. 318/254, 318/326, 318/138
[51] Int. Cl. ....................................................... H02k 29/00
[58] Field of Search ................. 318/254, 138, 696, 685, 439, 318/326, 327, 318

[56] References Cited

UNITED STATES PATENTS

| | | | |
|---|---|---|---|
| 3,435,310 | 3/1969 | Bradley | 318/685 |
| 3,435,314 | 3/1969 | Bradley et al. | 318/138 |
| 3,264,539 | 8/1966 | Sander | 318/254 X |
| 3,274,471 | 10/1966 | Moczala | 318/254 X |
| 3,440,506 | 4/1969 | Krestel et al. | 318/254 X |
| 3,448,359 | 6/1969 | Engel | 318/254 X |
| 3,461,367 | 8/1969 | Takeyasu et al. | 318/254 X |
| 3,465,224 | 9/1969 | Takeyasu | 318/254 X |

Primary Examiner—G. R. Simmons
Attorney—Robert G. Clay

[57] ABSTRACT

A DC motor formed of a stationary segmented armature winding and a two pole permanent magnet rotor, wherein a pair of Hall effect generators are mounted 90° apart within the armature winding to develop a pair of quadrature related sinusoidal signals and wherein a tachometer is disposed to generate a plurality of pulses for each revolution of the rotor. Commutation for the armature windings is achieved by an electronic switching circuit connected to receive the Hall generator signals and the tachometer pulse signal and respond to the phase relationships between these various signals to develop multiple phase switching signals in which the phase angles thereof are precisely correlated to the angle of rotation of the rotor. The motor is illustrated in the environment of a servo controlled magnetic tape transport, wherein the commutation signals or switching signals associated therewith serve as multi-phase tachometer or angular position indicating signals in a special servo controlled operation.

7 Claims, 5 Drawing Figures

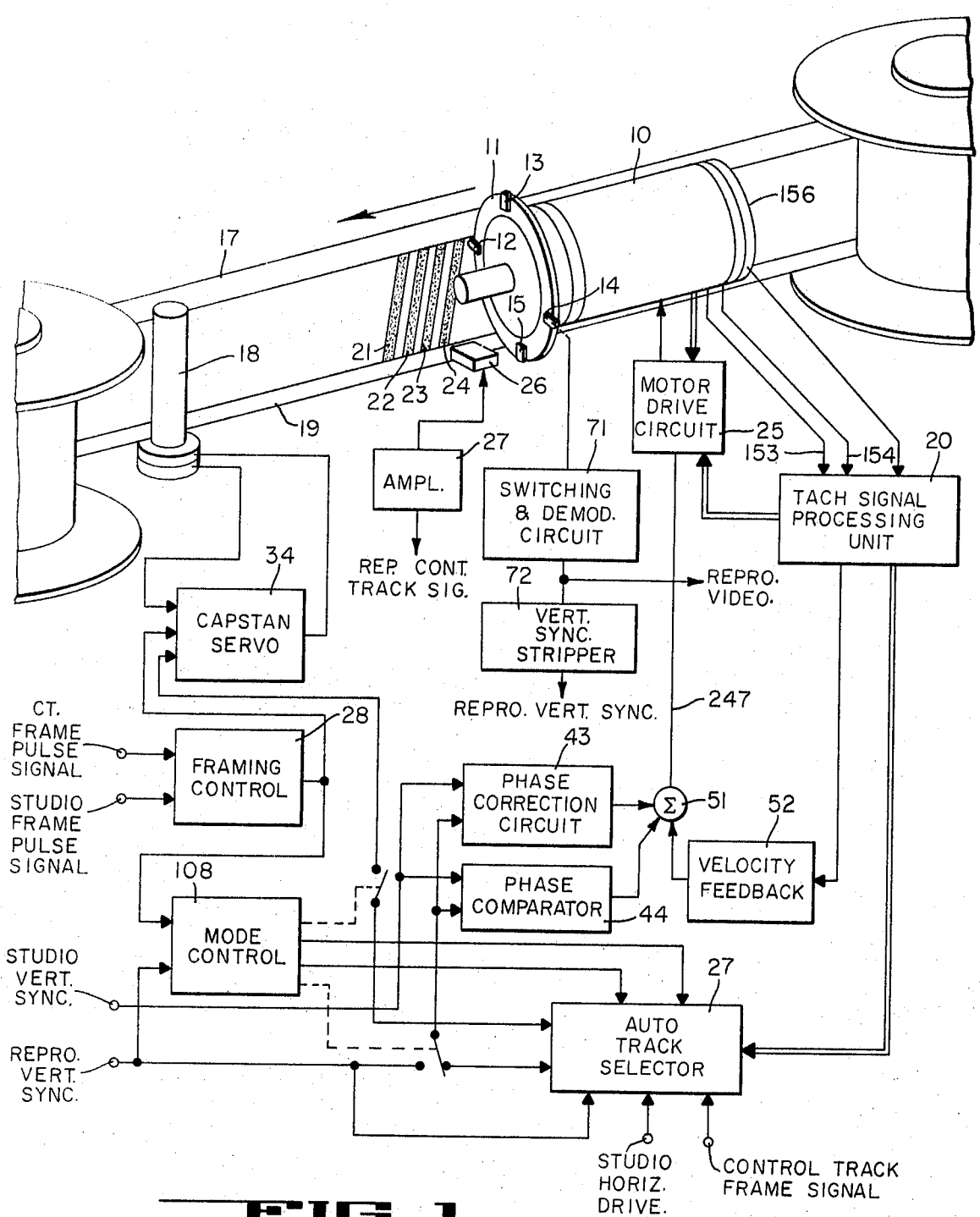
FIG_1
INVENTOR.
HAROLD V. CLARK
BY
Larry A. Jackson
ATTORNEY

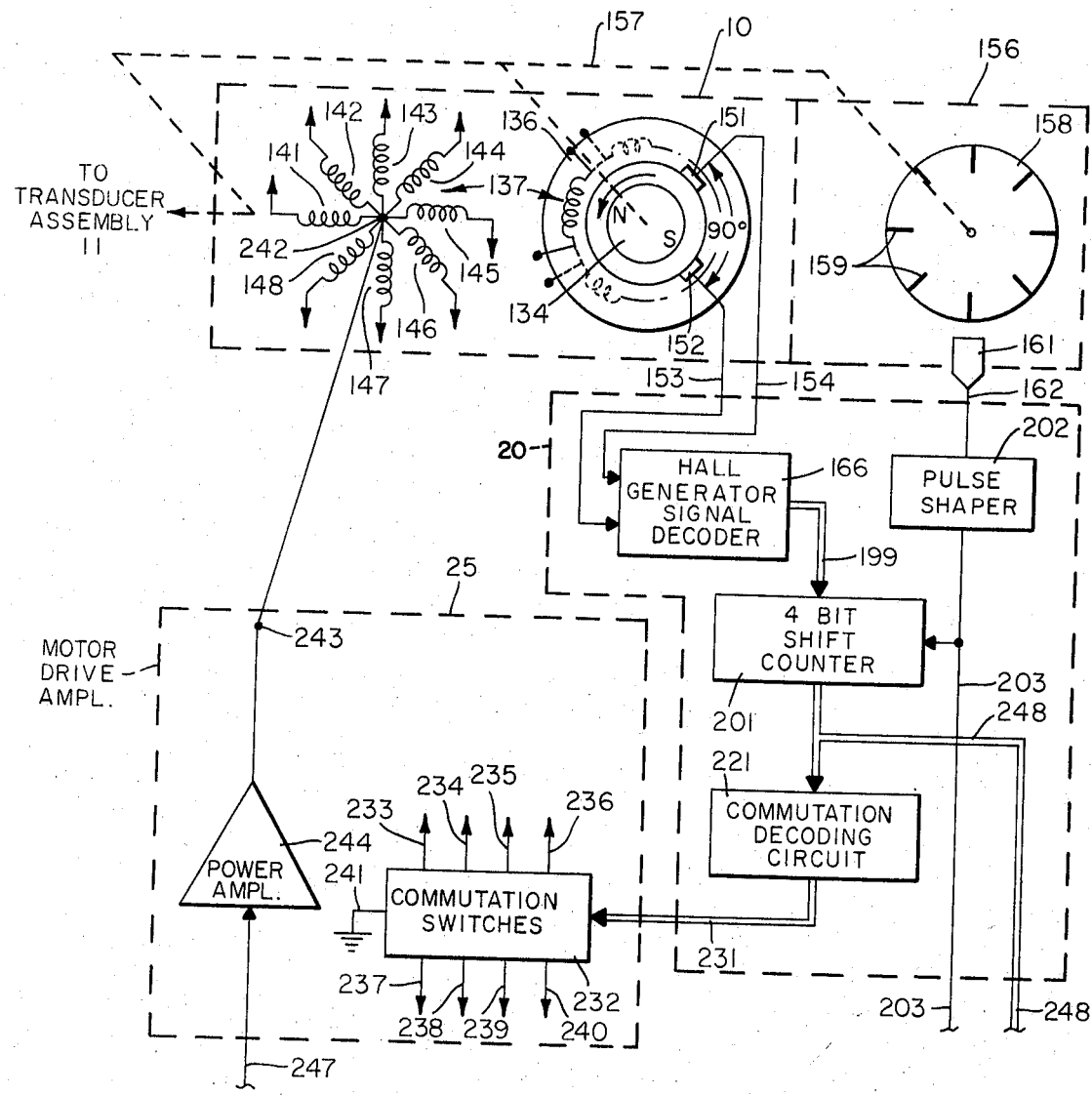
FIG_2

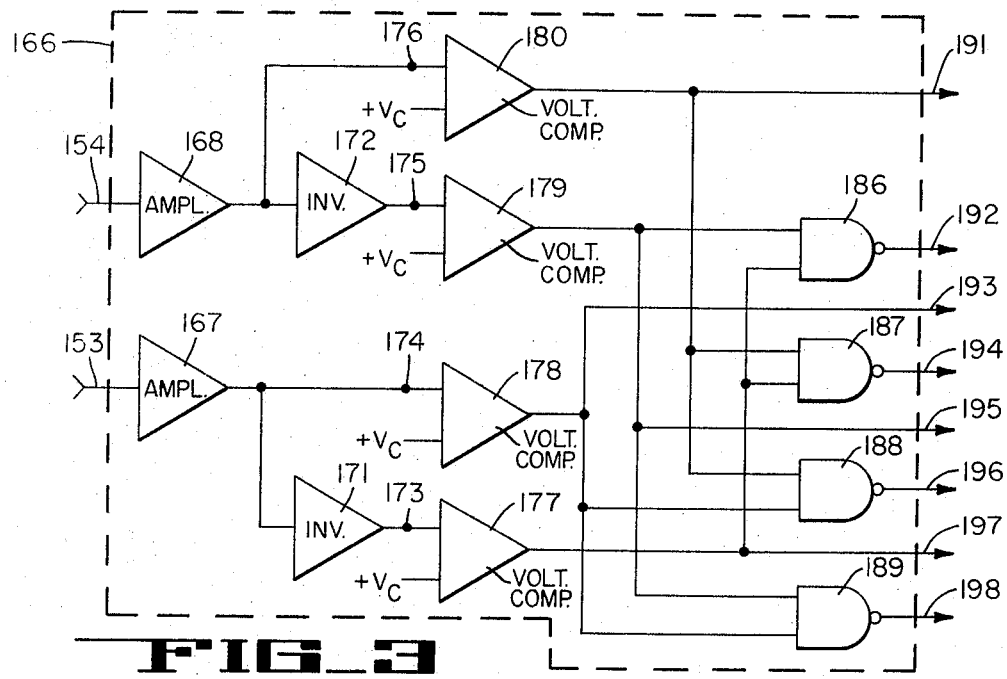
FIG_3
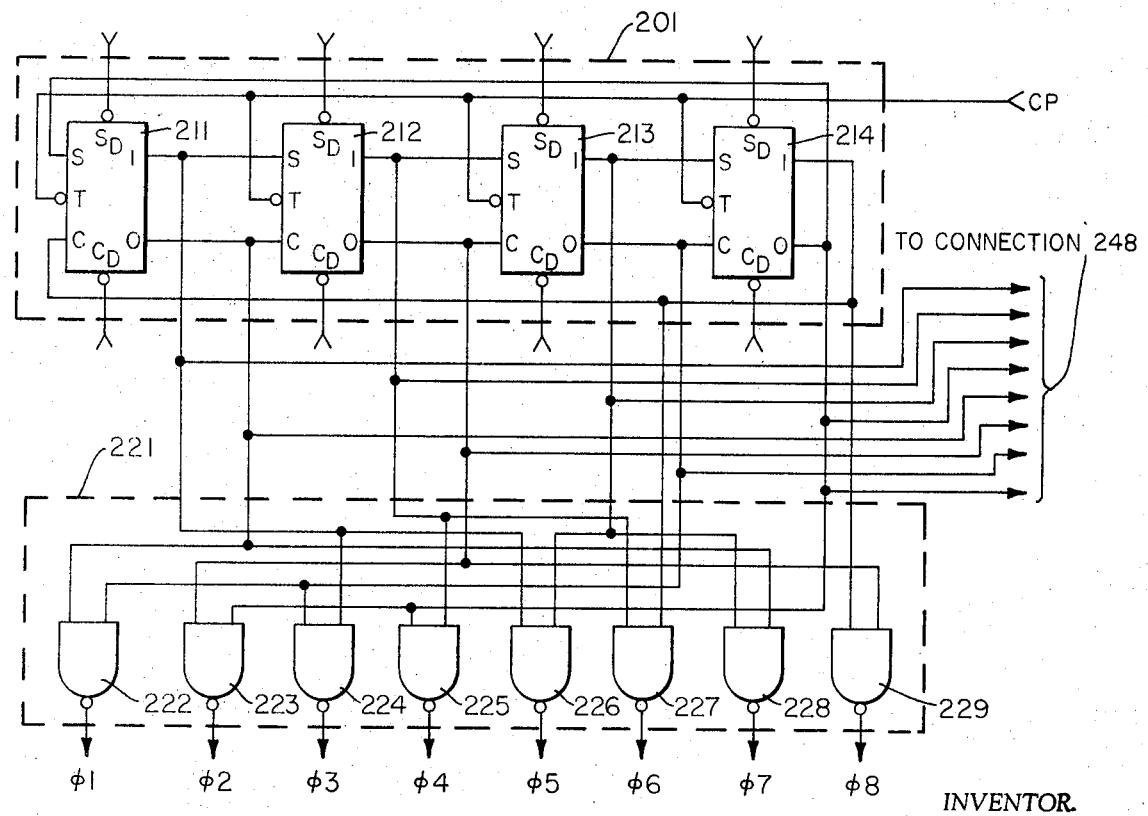
FIG_4
INVENTOR.
HAROLD V. CLARK
BY
[signature]
ATTORNEY Patented May 16, 1972

HALL GENERATOR 151

HALL GENERATOR 152

PICK UP 161

CP LINE 203

OUTPUT 191 TO $S_D$ OF FF 211
OUTPUT 192 TO $S_D$ OF FF 212
OUTPUT 193 TO $S_D$ OF FF 213
OUTPUT 194 TO $S_D$ OF FF 214
OUTPUT 195 TO $C_D$ OF FF 215
OUTPUT 196 TO $C_D$ OF FF 216
OUTPUT 197 TO $C_D$ OF FF 217
OUTPUT 198 TO $C_D$ OF FF 218

OUTPUT 1 OF FF 211
OUTPUT 1 OF FF 212

OUTPUT 1 OF FF 213
OUTPUT 1 OF FF 214

OUTPUT 0 OF FF 215
OUTPUT 0 OF FF 216
OUTPUT 0 OF FF 217
OUTPUT 0 OF FF 218

φ1
φ2
φ3
φ4
φ5
φ6
φ7
φ8

FIG_5

INVENTOR.
HAROLD V. CLARK
BY
*Larry J. Jackson*
ATTORNEY

BRUSHLESS DC MOTOR INCLUDING TACHOMETER COMMUTATION CIRCUIT

The present invention relates in general to dynamo-electric devices and, more particularly, to direct current motors operating without the aid of commutation brushes.

In electro-mechanical servo controlled systems, there are many applications where it is desirable to precisely control the velocity and phase of a rotating member. Such a rotating member may, for example, be found on a magnetic tape recorder of the type adapted for recording and reproducing wideband signals by rotating a magnetic record/reproduce head assembly at high speeds in a path scanning across the magnetic tape as the tape itself is longitudinally advanced passed the assembly. Such a recorder is described in U.S. Pat. No. 2,956,114 issued to Ginsburg et al. The substantial head-to-tape speed achieved by this arrangement has made magnetic tape recording and reproducing of broadcast quality video signals practical. As the rate at which the magnetic head wheel or assembly scans a prerecorded video signal determines the timing characteristics of the reproduce video waveform it will be apparent that an important aspect of the transport system is its ability to precisely servo control the velocity and phase of the rotating head assembly, sometimes referred to as the head wheel.

Certain transport systems have employed motors of a hysteresis synchronous type for driving the rotary transducer assembly. However, it has been found that such devices exhibit electro-mechanical resonant characteristics which interfere with the frequency response of the associated servo circuits and make it difficult to control the motor to the extent desired.

Other transport systems have employed DC motors, which are inherently more suited to precision servo control. However, DC motors which have been found otherwise satisfactory for this purpose have employed commutation brushes which give rise to several undesirable effects. For example, the high rate of electrical-mechanical switching between the brushes and commutators tends to generate radio frequency (RF) noise which interferes with the wideband video signal. Furthermore, mechanical brush friction against the slotted commutator surface causes rotational jitter of the motor and head wheel, thus disturbing the time-base stability of the recorded and reproduced wideband signal.

Accordingly, it is an object of the present invention to provide a brushless DC motor, particularly suited for precision servo control systems.

It is another object of the present invention to provide such a brushless DC motor having a construction adapted for low cost manufacture, without sacrificing the features of the motor which afford the precision servo control.

These and other objects are achieved in accordance with the present invention by a unique DC motor construction wherein the commutation signals are developed by an electronic switching network which utilizes the timing information from a tachometer producing a plurality of pulses per motor revolution, and from a pair of Hall effect generators producing quadrature related sinusoidal signals in response to rotation of the motor field. In the presently preferred embodiment, the armature windings and Hall generators are mounted stationary relative to a rotatable two pole permanent magnet. In operation, the Hall effect signals serve as a coarse phase identification of the angular position of the permanent magnet rotor while the sharp timing edges of the tachometer pulses accurately divide a full revolution of the rotor into useable commutation timing intervals. The electronic switching network functions to correlate the timing information provided by both of these signals and to develop commutation switching signals automatically and precisely phased with respect to the angular relation between the poles of the magnet rotor and the armature windings.

As a feature of the present invention, the switching circuit developing the commutation signals also serves to produce multi-phase tachometer or angular position signals useful in certain servo operations such as described in a U.S. application Ser. No. 25,052 for "Automatic Phasing of Servo Systems," by Harold V. Clark (ID-2053), filed Apr. 2, 1970 and assigned to the assignee of the present application.

These and other objects, features and advantages of the invention will become apparent from the following description and accompanying drawings respectively describing and illustrating the preferred embodiment of the invention, wherein:

FIG. 1 is a combined diagramatic view of a tape transport and electrical block diagram of a servo system employing the brushless DC motor and tachometer commutation circuit of the present invention;

FIG. 2 is a detailed functional diagram of the motor and tachometer commutation circuit generally shown by FIG. 1;

FIG. 3 is a detailed schematic diagram of the switching logic employed by one of the functional blocks illustrated in FIG. 2;

FIG. 4 is another detailed schematic diagram of the switching logic employed by another functional block in the arrangement illustrated by FIG. 2; and FIG. 5 is a waveform diagram drawn to a common time-base and illustrating the relationship between various electrical signals occurring within the circuit shown by FIGS. 1 through 4.

With reference to FIG. 1, a motor 10 having a construction in accordance with the present invention is illustrated in the environment of a magnetic transport, wherein the motor is disposed for rotatably driving a transducer assembly 11 carrying a plurality of transducers 12, 13, 14 and 15 transversely scanning a magnetic tape 17. Motor 10 is of a brushless DC type wherein commutation for energizing the armature windings is performed externally of the motor housing by a commutation switching circuit provided as shown in FIG. 1 by tachometer signal processing unit 20 and a motor drive circuit 25. Circuit 25, unit 20 and the motor 10 itself, cooperate in a feedback or servo circuit to precisely control the speed of rotation and the phase angle of assembly 11 to permit transducers 12–15 to first record and thereafter reproduce wideband signals magnetically stored on successive transverse tape tracks, such as tracks 21, 22, 23 and 24. The longitudinal spacing of tracks 21–24 is provided by a concurrent longitudinal motion of tape 17 in response to a servo controlled rotation of a capstan 18. While the preferred embodiment of the invention is described in terms of a motor, it will be apparent that the invention is useful more generally as a dynamoelectric device.

With reference to FIG. 2, the important features of motor 10, unit 20 and circuit 25 are illustrated in greater detail. As diagramatically shown, motor 10 is formed of a two pole permanent magnet rotor 134 mounted for relative rotation with respect to a housing 136 carrying armature windings 137. Rotor 136 thus produces a rotating magnetic field which cuts through the turns of windings 137, which when suitably energized effect a rotational force on the permanent magnet rotor. In this instance, armature windings 137 consist of eight sections or segments, 141, 142, 143, 144, 145, 146, 147 and 148 circumferentially spaced within housing 136 around the axis of rotation of rotor 134 in a manner well known. To simplify the illustration, the segments of armature windings 137 are schematically shown to the left of housing 136 and rotor 134. In the presently preferred embodiment, armature windings 137 are maintained stationary while the permanent magnet or field producing means is rotated relative thereto. This construction, using a permanent magnet as the field producing means, greatly simplifies the construction of the motor assembly, and is believed to significantly improve the reliability and the smooth running of the unit.

In order to develop suitably phased signals for timed energization of winding segments 141-148, the present invention provides for generating two different types of angular position signals, representing the phase or rotational position of the magnetic field emanating from rotor 134. One set of angular position signals is developed by a pair of Hall effect generator devices 151 and 152 carried by housing 136 so as to be mounted in fixed relation with respect to armature windings 137 and within the influence of the rotating magnetic field developed by generator 134. Moreover, devices 151 and 152 are mounted in quadrature, i.e., 90° apart, relative to the rotational axis of rotor 134. Thus disposed, devices 151 and 152 each produce a voltage having a polarity and magnitude proportional to the direction and intensity of the magnetic field to which the devices are subjected. The use of Hall effect devices or generators as a means for measuring the intensity or changes in intensity of a magnetic field is well known, and accordingly further details regarding the principal operation and construction of such devices is not required for the purpose of understanding the present invention. By virtue of the quadrature placement of devices 151 and 152, the signals issued over lines 153 and 154 to unit 20 consist of a pair of quadrature related sinusoidal voltage waveforms, such as shown by FIG. 5. As described in more detail herein, the Hall effect generated sinusoidal signals are decoded to produce switching signals which provide a coarse identification of the angular position of rotor 134.

In addition to the Hall generator signals, the present invention provides for generating another set of angular position indicating signals, here in the form of a pulse generating tachometer 156 mounted to motor 10 as schematically illustrated. By means of a mechanical connection or coupling shown in FIG. 2 by dotted line 157, a tachometer wheel or disc 158, forming a part of tachometer 156, jointly rotates with rotor 134 and carries a plurality, in this instance eight equally circumferentially spaced index means 159. Index means 159 may, for example, take the form of ferromagnetic slugs, the relative movement of which past a magnetic pick-up 161 causes an electrical pulse to be issued over a line 162 through unit 20. Alternatively, tachometer 156 may be provided by any of a variety of equivalent devices. For the purpose of the present invention, tachometer 156 may be thought of as a device producing a preselected number of relatively sharply defined electrical pulses, occurring at known angular positions with respect to the poles of permanent magnet rotor 134 for a full revolution thereof. Furthermore, the number of pulses per revolution of rotor 134 preferably equals the number of segments into which armature winding 137 is divided, in this instance eight.

The angular position indicating signals developed on lines 153, 154 and 162 are fed to processing unit 20 which responds to the timing information carried thereby to develop suitably phased commutation signals for sequential energization of armature winding segments 141-148. In particular, the quadrature related sinusoidal signals on lines 153 and 154 are fed to a Hall generator signal decoder 166 shown by FIGS. 2 and 3. Decoder 166 functions to develop a set of eight discrete level switching signals, which taken together identify the angular position of the poles of rotor 134 to within ±22-½° of their actual angular condition. For this purpose, decoder 166 comprises separate amplifiers 167 and 168 having inputs responsive to the relatively weak sinusoidal Hall effect voltage signals developed on lines 153 and 154. After suitable amplification, each of the Hall generator signals is split into opposing phase components (180° apart) by means of polarity inverters 171 and 172 each connected in a serial signal path from the output of an associated one of amplifier 167 and 168. Thus, four separate signals appear at junctions 173, 174, 175 and 176, wherein the signals at junctions 175 and 176 are oppositely phased with respect to one another and quadrature with respect to the oppositely phased signals appearing at junctions 173 and 174. Each signal is applied to the input of one of a plurality of four voltage comparators 177, 178, 179 and 180, which serve to detect a positive going excursion of the associated input signal past a threshold voltage level, in this instance represented by $+V_C$, which as shown is applied to the remaining terminal of each of comparators 177-180.

Comparators 177-180 are essentially saturable amplifiers, wherein so long as the input voltages at junctions 173-176 remain less than $+V_C$ the outputs of the respective comparators assume one discrete level or voltage state. An excursion of the input signal above $+V_C$ results in the output of the respective comparator assuming a second discrete level or voltage state. In order to develop signal information representing the angular position of rotor 134 to within ±22-½°, the reference voltage level $+V_C$ is selected such that the respective comparators switch state at times lying substantially midway between consecutive pulses issued by tachometer 156. In this instance $V_C$ is set at approximately ⅓ of the zero to peak amplitude of the sinusoidal Hall generator signals at the comparator inputs. This, in effect, causes the outputs of each of comparators 177-180 to change state in response to and for the duration of each positive peak of its associated input signal, with the leading and trailing edges of such signals roughly corresponding to ±67-½° angular degrees on either side of the peak magnitude. FIG. 5 illustrates the phase relationship between the sinusoidal Hall generator signals and the decoded switching signals developed therefrom. For this purpose, the amplitudes of the sinusoidal Hall generator signals in FIG. 5 correspond to the relative signal amplitudes presented at junctions 173-176.

The four phase indicating signals available at the outputs of comparators 177-180 are further divided into eight unique phase switching signals by means of a set of four electrical gates 186, 187, 188 and 189 having their respective inputs connected as shown to provide this further phase division of the switching signals. The eight signals thereby provided appear at outputs 191, 192, 193, 194, 195, 196, 197 and 198 of decoder 166 as shown by FIG. 3, wherein the waveforms of these signals are shown by FIG. 5.

It will be observed from FIG. 5 that the switching signals available at the outputs of decoder 166 identify the instantaneous angular position of the poles of permanent magnet rotor 134 to within ±22-½° of its actual angular condition with respect to the placement of Hall devices 151 and 152 and thus with respect to the location of armature windings 137. As shown by FIG. 2, the switching signals issued at outputs 191-198 are extended from decoder 166 over a connection 199 to a shift counter 201. Simultaneously the set of tachometer pulses developed by pick-up 161 and extended to unit 20 over line 162 are suitably shaped by a pulse shaper 202 and thereafter extended to counter 201 over a line 203. The pulse shaping operation provided by shaper 202 is illustrated by the waveforms of FIG. 5.

Shift counter 201 correlates the timing information provided by the decoded Hall generator signals over connection 199 and the tachometer pulse signal available over line 203 and in response thereto develops a set of phase related switching signals. Each such signal has a period corresponding to a full revolution of rotor 134 and defines a unique phase relationship therewith. The phase of these signals is determined by the Hall generator signals. Moreover, the step transitions of these signals between switching states occur at times precisely defined by the pulse information from tachometer 156 rather than at the less precise switching times of the decoded Hall generator signals.

The circuitry of shift counter 201 is best illustrated by FIG. 4, and as shown therein the counter comprises a set of four bistable multivibrators or flip-flops 211, 212, 213 and 214, each having their several inputs and outputs interconnected in a shift counter fashion. In particular, the phase indicating switching signals developed by Hall generator signal decoder 166 are connected to the direct set ($S_D$) and direct clear ($C_D$) input terminals of flip-flops 211-214, specifically designated in FIG. 5, and in a manner which causes flip-flops 211-214 to change state one at a time, in succession in response to each incoming clock pulse applied jointly to the clock (T) inputs. Thus, each flip-flop 211-214 changes state in response to every fourth clock pulse so that for eight clock pulses or a full revolution of rotor 134, each flip-flop completes a full switching period.

It will be observed that the decoded Hall generator signals function to insure proper operating phase of flip-flops 211-

214 as they respond to the continuous train of clock pulses issued by tachometer 156. In the event of a switching error, the Hall generator signals applied to the direct set and direct clear inputs override the response of the flip-flops to the clock pulses so as to serve as a continuous verification and automatic correction of the instantaneous phase state of shift counter 201. Moreover, during start-up the Hall generator signals provide correct phase information at zero and low motor speed for proper commutation of the armature windings without requiring, for example, a full revolution and thus a full cycle pulse output from tachometer 156. In fact, it is possible to run motor 10 directly from the commutation switching information developed by the Hall generators, without the aid of the tachometer pulse signal. However, during steady-state running the greater degree of precision control afforded by the fully processed commutation signals makes it preferable to employ the tachometer signal information.

The signals available at the "1" and "0" outputs of flip-flops 211-214 are shown by FIG. 5 to consist of eight signals, having a 45° phase spacing, and a switching period corresponding to a full revolution of rotor 134. While these signals carry sufficient timing information for commutation, the equal on-off duty cycle characteristics thereof are not suitable for commutated energization of the armature winding segments.

To develop commutation signals having suitable duty cycle or "on" - "off" switching characteristics, a commutation decoding circuit 221 is provided as shown by FIGS. 2 and 4, wherein the output signals from counter 201 are connected as shown to certain inputs of a set of electrical gates 222, 223, 224, 225, 226, 227, 228 and 229 as shown. By decoding the outputs of flip-flops 211-214 in this manner, gates 222-229 issue eight suitably phased switching signals, 01, 02, 03, 04, 05, 06, 07 and 08 as shown by FIG. 5. In this instance, it is desired to energize each winding segment 141-148 of the armature for ¼ or 90° of revolution of rotor 134. Accordingly, switching signals 01-08, as shown by FIG. 5, exhibit an off period for ¾ or 270° of rotation and an "on" interval during which an associated winding segment is energized, for ¼ or 90° of rotor rotation. Furthermore, the leading and trailing edges of the "on" interval of each of signals 01-08 are coincident with the sharp trigger pulses issued over line 203 from tachometer 156.

To effect the actual energization of winding segments 141-148, the commutation switching signals 01-08 are fed from circuit 221 over a connection 231 to commutation switches 232 having a set of eight output terminals 233, 234, 235, 236, 237, 238, 239 and 240 disposed for connection to one end of associated winding segments 140-148. In operation, commutation switching signals 01-08 each function to connect an associated one of terminals 233-240 and the associated winding segment to common 241 during the "on" phase interval. The other ends of armature winding 141-148 are jointly connected to a junction 242 which is extended to an output 243 of a power amplifier 244. Output 243 provides a controlled voltage relative to common 241 in response to a control input signal applied to amplifier 244 over an input line 247, where the magnitude of the resulting output voltage determines the rotational force applied through armature windings 137 to rotor 234. As described in the above referenced U.S. application, Ser. No. 25,052, the control voltage applied to input line 247 is derived from a summing junction 51, as shown by FIG. 1, which presents a resultant control voltage in response to the outputs of the several feedback loops controlling motor 10, here consisting of a velocity feedback 52, a phase comparator 44, and a phase correction circuit 43. In that application, motor drive circuit 25 is designated as motor drive amplifier 56 and is shown in somewhat more simplified form.

For proper operation, the placement of Hall generators 151 and 152 must be such that the output signals therefrom indicate the instantaneous relation of the rotating magnetic field with respect to the armature windings 137. In particular, one of the Hall generators is first located at the center of winding distribution of an arbitrarily selected reference winding segment (one of segments 141-148), such that the output signal from the generator passes through its ± peak amplitude levels as the North and South poles of rotor 137 cross the center of the associated core or winding segment. Thereafter, the remaining Hall generator is disposed 90° in either direction from the first generator, which in the present embodiment corresponds to a location at the center of the second winding segment removed from the reference segment. The tachometer disc 158 is disposed at a fixed angle relative to rotor 137 such that index means 159 cause a tachometer clock pulse to be issued each time one of the permanent magnet rotor poles crosses the distribution center of one of winding segments 141-148. The winding segments must, of course, be correlated with respect to the reference winding segment and in accordance therewith connected to the properly phased commutation switches. It will be noted, the foregoing disposition of the Hall generators 151 and 152 and tachometer disc 158 provides the desired alternate timing of the tachometer pulses and the level transitions of the decoded sinusoidal Hall generator signals.

As a further feature and advantage of the present invention, tachometer signal processing unit 20 provides at the output of shift counter 201 a plurality of eight phase tachometer feedback signals for use in the automatic track selecting circuit described in U.S. application Ser. No. 25,052. FIGS. 1 and 2 of the present application illustrate the eight phase tachometer signals produced at the output of shift counter 201, which are fed over a connection 248 to automatic track selector 27. The eight phase tachometer feedback signals are developed at the "1" and "0" outputs of flip-flops 211-214 as shown by FIG. 4 and have the timing and phase characteristics as shown by FIG. 5.

The remaining components of the system shown by FIG. 1 are described in greater detail in connection with the above noted U.S. application, Ser. No. 25,052. Briefly, tape 17 is longitudinally driven past rotating transducer assembly 11 by a capstan 18 functioning in response to a capstan servo 34, a framing control 28, and a mode control 108. The various servo control modes are facilitated by a control track 19 carrying a control signal recorded simultaneously with the wideband transverse tracks, such as tracks 21-24, wherein the control track signal is reproduced by a transducer 26 and a reproduce amplifier 27. The wideband signal is reproduced by transducers 12-15 successively scanning the transverse tracks whereupon the switching and demodulator circuit 71 functions to correlate and combine the reproduce signals from the transducers and demodulate the signal from its frequency modulated state as recorded. The reproduce wideband signal, in this instance the video signal, is thus available at the output of circuit 71 as shown. A vertical sync stripper 72 serves to make available the vertical sync pulse from the reproduce signal for use in certain other signal control modes of the transport system.

What is claimed is:

1. A dynamoelectric apparatus comprising,
armature winding means and housing therefor;
magnetic field producing means disposed for relative rotation with respect to said winding means and housing;
magnetic field sensor means carried by said housing in fixed position relative to said winding means and developing signals proportional to the phase angle of relative rotation of said field means,
tachometer means other than said sensor means responsive to said relative rotation of said field means generating a set of electrical pulses for each full relative revolution thereof, and
commutation switching circuit means connected to said armature winding means and having switching states selectively energizing said winding means in response to said sensor means and said tachometer means, said switching circuit being responsive to each electrical pulse from said tachometer means to undergo a transition between switching states and being responsive to signals from said sensor means to cause said switching states to assume a particular phase relationship to the rotation of said field means.

2. The apparatus as defined in claim 1, wherein said field sensor means comprise a pair of Hall effect devices carried by the housing for said winding means, said devices being mounted in quadrature relation with respect to the axis of rotation of said field producing means and said devices developing quadrature related signals in response to such rotation.

3. The apparatus as defined in claim 2, wherein said armature winding means has a preselected number of winding segments, and said tachometer means is further defined by said set of electrical pulses being equal to the number of said winding segments and occurring at spaced intervals.

4. The apparatus as defined by claim 1, wherein said field producing means comprises a two pole permanent magnet mounted for rotation, and said armature winding means comprise a plurality of winding segments mounted circumferentially about the axis of rotation of said magnet.

5. The apparatus as defined in claim 4, said tachometer means comprising a disc member mounted for joint rotation with said permanent magnet, said disc member being formed with a plurality of index means, and a pick-up means mounted stationary relative to said member and being responsive to said index means for developing said set of electrical pulses.

6. The apparatus as defined in claim 2, said commutation switching circuit means comprising a Hall generator signal decoder means having a pair of phase splitting means each connected to receive the signal from one of said devices and develop opposing phase signals for each of the quadrature related signals, and circuit means responsive to said opposing phase signals issuing a unique switching signal for each quarter of relative rotation between said armature winding means and said field producing means.

7. The apparatus as defined by claim 6, said commutation switching circuit means comprising a shift counter clock having inputs connected to receive said tachometer pulses and having direct set and direct clear inputs connected to receive the signals developed by said Hall generator signal decoder, said shift counter having outputs issuing a set of phase related switching signals having the phases thereof determined by said Hall decoder signals and having the leading and trailing edges determined by said tachometer pulses.

* * * * *